UNITED STATES PATENT OFFICE.

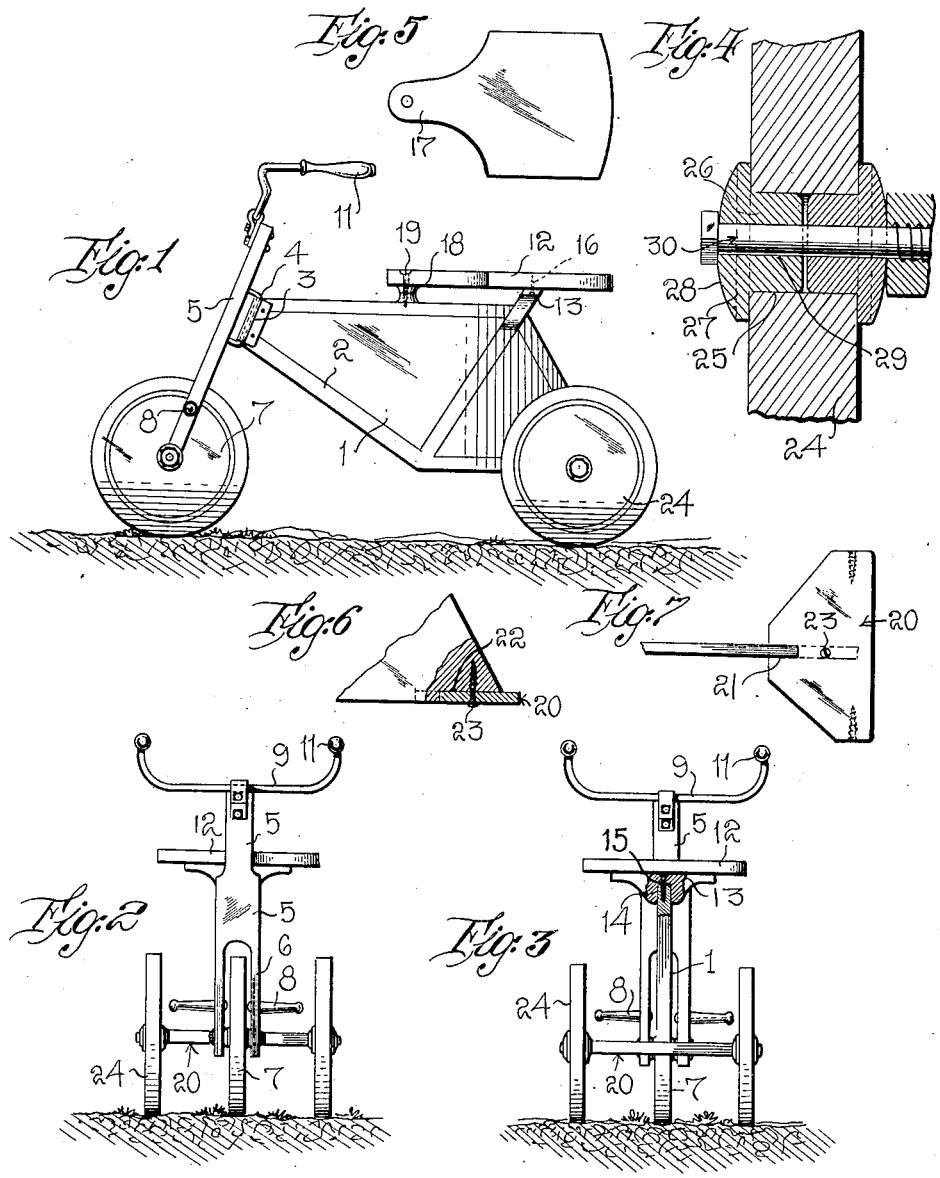

HARRY H. HISTAND, OF DOYLESTOWN, PENNSYLVANIA.

CHILD'S VELOCIPEDE.

1,348,113.  Specification of Letters Patent.  Patented July 27, 1920.

Application filed December 14, 1918. Serial No. 266,762.

*To all whom it may concern:*

Be it known that I, HARRY H. HISTAND, a citizen of the United States, residing at Doylestown, in the county of Bucks and State of Pennsylvania, have invented certain new and useful Improvements in Children's Velocipedes, of which the following is a specification.

This invention relates to children's velocipedes and more particularly to that type intended primarily for use by young children and which devices are constructed practically entirely of wood, being either propelled by pushing contact of the feet against the ground or employed as a coaster, and it is one object of the present invention to provide a velocipede of this type which may be manufactured at a very low cost, which will be substantial in its construction, and upon which two children may simultaneously ride if desired.

Another object of the invention is to so construct the velocipede that it will have the general appearance of a bicycle without, however, being in any sense a complicated construction.

A further object of the invention is to provide in a velocipede of this type, a horizontally disposed rear step upon which a second child may stand, and novel means for journaling the rear wheels of the velocipede at the opposite sides of this step.

The invention also has as one of its objects the provision of a novel mounting for the seat of the velocipede which mounting will be of such nature as to effectually brace the seat against displacement and particularly against lateral tilting under rough usage.

In the accompanying drawings:

Figure 1 is a side elevation of the velocipede embodying the present invention;

Fig. 2 is a front elevation thereof;

Fig. 3 is a rear elevation;

Fig. 4 is a detail vertical sectional view illustrating the manner of journaling the rear wheels;

Fig. 5 is a top plan view of the seat;

Fig. 6 is a view partly in elevation and partly in front to rear vertical section illustrating the manner of securing the rear step of the velocipede in place;

Fig. 7 is a bottom plan view of the step and the rear lower portion of the body of the velocipede.

As stated, the velocipede is made almost entirely of wood and the body of the same, indicated in general by the reference numeral 1, is in the nature of a one-piece wooden slab or board of a suitable thickness and having a general marginal outline conforming to the contour of an ordinary bicycle frame. Upon the opposite sides of this body 1 may be painted, as indicated by the numeral 2, the representation of the frame members of a bicycle, this painted representation and the remainder of the surface of each side of the body being in distinct and contrasting colors so as to give to the body the general appearance of a bicycle frame. A hinge member 3 of any suitable construction is secured at the upper forward corner of the body 1 and pivotally engages a pintle member 4 which is carried by the head of the velocipede, which latter is indicated by the numeral 5. The head 5 is bifurcated in its lower portion so as to provide forks 6 simulating the front forks of a bicycle frame, and journaled in the fork is the front wheel of the velocipede indicated by the numeral 7. This wheel is preferably in the form of a one-piece circular wooden body and the opposite faces of the body may have painted thereon the representation of a tire and rim. Suitable foot rests 8 may be provided upon the forks 6, and a suitable handle bar 9 is mounted as at 10 at the upper end of the head 5. This handle bar may be formed from a suitable length of rod material bent to simulate the handle bar of a bicycle and may be provided with suitable hand grips 11.

The seat of the velocipede is clearly shown in Figs. 1, 3 and 5 of the drawings and the same, indicated by the numeral 12, is formed from wood and is of the general marginal outline shown most clearly in Fig. 5. The support for the rear portion of the seat comprises a bolster block 13 which is bifurcated as indicated by the numeral 14 so as to straddle the upper rear corner of the body 1 as clearly shown in Fig. 3, a screw or the like 15 being driven through the block above the bifurcation 14 and downwardly into the upper edge of the corner portion of the said body 1. The block 13 is disposed in the inclined position shown in Fig. 1 and the upper edge thereof is beveled so as to occupy a horizontal plane and snugly engage the under side of the seat 12, being secured thereto by nails or screws 16 driven through the ends of the block 13 and into the under side of the said seat. The forward or pommel end of the seat, indicated by the numeral 17, is supported upon a relatively short wooden post 18 which is disposed between its under side and the upper edge of the body 1, a screw or other suitable fastening element 19 being driven through the said end 17 of the seat, the said post 19, and into the upper edge of the body 1.

As heretofore stated, the velocipede embodying the present invention includes a rear step and this step in the drawings is indicated in general by the numeral 20 and is in the nature of a flat board having parallel front and rear edges and diagonal side edges as clearly shown in Fig. 7 of the drawings. In its forward edge, the rear step 20 is formed with a recess 21 of a width equal substantially to the thickness of the body 1, and the lower edge of the said body 1 is likewise formed with a recess 22 of a depth substantially equal to the thickness of the said rear step 20. In assembling the rear step with the body, the step is disposed to seat at its intermediate portion in the recess 22 in the lower edge of the body 1 and with the recess 21 in the said step receiving the lower edge portion of the said body which is located immediately in advance of the recess 22, and after such assemblage a screw or other suitable fastening element 23 is driven through the said intermediate portion of the step and into the upper wall of the recess 22 as clearly shown in Fig. 6. By reason of the construction just described, the rear step is securely united to the lower rear corner of the body 1 and effectually held against displacement in any direction.

The rear wheels of the body are fashioned in the same form as the front wheel 7 and are indicated by the numeral 24 and each of these wheels is formed axially with an opening 25 into which are fitted hard wood bushings 26. Each of these bushings comprises a cylindrical body portion of exterior diameter to fit snugly within the opening 25, and a head 27 which is circular and the outer face of which is convex as indicated by the numeral 28. Each of these bushings is formed with a bore 29 and the bushings are fitted into the opposite ends of the opening 25 of each wheel so that the inner ends of their bodies will touch or nearly touch as shown in Fig. 4, and so that the inner sides of their heads will abut against the adjacent faces of the wheel 24. A lag screw 30 is fitted at its smooth shank portion through the bores 29 of the bushings 26 and is threaded into one side edge of the rear step 20, the convex face of the head of the bushing next adjacent the said step abutting against the said side edge of the step but offering little resistance to the rotation of the wheel due to the convex form of the said face. Likewise the rounded face of the head of the outer bushing abuts against the head of the lag screw but for the same reason offers little resistance to the rotation of the wheel. It will be evident that these bushings, being of hard wood will not soon become worn down and furthermore, they provide a bearing of maximum length for the respective wheels although the wheels themselves may be relatively thin. The rear step of the velocipede serves, of course, as a means whereby a young child may readily mount the velocipede and it may also serve to support a second child standing behind one occupying the seat 12.

It will be understood that upon either or both faces of the body 1 there may be painted, or depicted by a transparency or otherwise, the representation of the American flag or of any object desired.

Having thus described the invention, what is claimed as new is:

1. A child's velocipede comprising an upright body, a ground wheel supporting the forward end of the body, a ground wheel supporting the rear end of the body, a pillow block straddling the upper edge of the body and secured to the said body, a seat disposed at its rear portion upon the upper edge of the pillow block and secured thereto, a post disposed between the under side of the seat at the forward portion thereof and the upper edge of the said body, and a fastening means secured through the seat and post and into the body.

2. A child's velocipede comprising a flat sided upright body, a ground wheel supporting the forward end of the body, the lower edge of the body at the rear thereof being formed with a recess, a rear step comprising a flat horizontally disposed body disposed at its intermediate portion in the recess and in its forward edge formed with a recess receiving the lower edge portion of the body in advance of the recess first mentioned, a securing means passed through the under side of the step and into the upper wall of the recess in the body, and ground wheels journaled at the opposite sides of the said step.

3. In a child's velocipede, a body element, a ground wheel having a central opening, bushings fitted into the opposite ends of the opening and having enlarged heads bearing against the adjacent sides of the wheel, the head of one of said bushings having a convex face abutting the said body element, the bushings having alined bores, and a lag screw or the like fitted through the said bores in the bushings and driven into the said body element.

4. In a child's velocipede, a body element, a ground wheel having a central opening, hard wood bushings fitted into the opposite ends of the opening and having enlarged heads bearing against the adjacent sides of the wheel, the head of one of said bushings having a convex face abutting the said body element, the bushings having alined bores, and a lag screw or the like fitted through the said bores in the bushings and driven into the said body element, the head of the other bushing also having a convex face abutting against the head of the lag screw.

In testimony whereof I affix my signature.

HARRY H. HISTAND. [L. S.]